US012777120B2

(12) United States Patent
White

(10) Patent No.: US 12,777,120 B2
(45) Date of Patent: Oct. 27, 2026

(54) MALWARE DETECTION AND SCREENING SYSTEMS

(71) Applicant: Truist Bank, Charlotte, NC (US)

(72) Inventor: Brian Matthew White, Mint Hill, NC (US)

(73) Assignee: TRUIST BANK, Charlotte, NC (US)

( * ) Notice: Subject to any disclaimer, the term of this patent is extended or adjusted under 35 U.S.C. 154(b) by 63 days.

(21) Appl. No.: 18/894,536

(22) Filed: Sep. 24, 2024

(65) Prior Publication Data

US 2026/0057071 A1 Feb. 26, 2026

Related U.S. Application Data

(60) Provisional application No. 63/687,079, filed on Aug. 26, 2024.

(51) Int. Cl.

| | |
|---|---|
| ***H04M 3/436*** | (2006.01) |
| ***G06F 21/56*** | (2013.01) |
| ***H04L 9/40*** | (2022.01) |
| ***H04L 41/16*** | (2022.01) |
| ***H04M 3/22*** | (2006.01) |
| ***H04M 3/42*** | (2006.01) |

(Continued)

(52) U.S. Cl.

CPC .......... *H04M 3/4365* (2013.01); *G06F 21/56* (2013.01); *H04L 41/16* (2013.01); *H04L 63/02* (2013.01); *H04L 63/0236* (2013.01); *H04L 63/1416* (2013.01); *H04L 63/1425* (2013.01); *H04L 63/145* (2013.01); *H04M 3/2281* (2013.01); *H04M 3/42042* (2013.01); *H04M 3/42374* (2013.01); *H04M 3/436* (2013.01); *H04W 12/088* (2021.01); *H04W 12/128* (2021.01)

(58) Field of Classification Search

CPC ......... G06F 21/56; H04L 63/02; H04L 41/16; H04L 63/0236; H04L 63/1416; H04L 63/1425; H04L 63/145

See application file for complete search history.

(56) References Cited

U.S. PATENT DOCUMENTS

| | | | | |
|---|---|---|---|---|
| 2013/0097706 A1* | 4/2013 | Titonis | .................. | G06F 21/566 726/22 |
| 2015/0237015 A1* | 8/2015 | Bansal | .................... | H04L 63/20 726/13 |
| 2022/0078008 A1* | 3/2022 | Kong | .................... | G06F 21/645 |

(Continued)

*Primary Examiner* — Sangseok Park

(74) *Attorney, Agent, or Firm* — Michael A. Springs, Esq.; Shumaker, Loop & Kendrick, LLP; Patrick B. Horne

(57) ABSTRACT

Systems and methods receive a malware detection and screening subscription request to screen software application downloads for different types of malware for user device(s) associated with an entity as part of a firewall subscription. The user device(s) are registered to apply the firewall subscription to screen software application download requests, and network traffic to the user device(s) is monitored via a network firewall. From the monitored network traffic, it is ascertained, via the network firewall, that a device of the user device(s) is initiating download of a software application. The software application is screen for the different types of malware, the screening including a screening protocol. Based on the screening, it is determined that the software application includes at least one type of malware, and a notification that the software application likely includes the at least one type of malware is transmitted to the device.

20 Claims, 8 Drawing Sheets

(51) Int. Cl.
*H04W 12/088* (2021.01)
*H04W 12/128* (2021.01)

(56) References Cited

U.S. PATENT DOCUMENTS

| | | | | |
|---|---|---|---|---|
| 2024/0195782 | A1* | 6/2024 | Rodriguez | H04L 63/0254 |
| 2024/0195830 | A1* | 6/2024 | Jayaraman | H04L 63/1433 |
| 2025/0013748 | A1* | 1/2025 | Lancioni | G06F 21/562 |

* cited by examiner

MALWARE DETECTION AND SCREENING SYSTEMS

CROSS REFERENCE TO RELATED APPLICATIONS

This application claims priority to and benefit of U.S. Provisional Patent Application No. 63/687,079 filed on Aug. 26, 2024, entitled SYSTEMS FOR A TELECOMMUNICATIONS NETWORK TO SCREEN TELEPHONE CALLS FROM TRANSMITTING SIGNAL SOURCES, the entire contents of which are hereby expressly incorporated by reference.

TECHNICAL FIELD

The present invention relates generally to the field of device security, and more particularly embodiments of the invention relate to systems for malware detection and screening.

BACKGROUND OF THE INVENTION

Malware, or malicious software, presents a significant risk to the security of computer systems of an enterprise. Not only can malware disrupt the normal operational functions of the computer system of a single computing device, but malware can also cause widespread damage to entire enterprise systems of the enterprise. Malware can corrupt data and infect files by altering or deleting the files. Malware can also make data and files inaccessible by encrypting the data and files without the knowledge of the enterprise or device user. The data and files of the enterprise can be compromised or lost completely, which can be very detrimental to an enterprise or organization. Data corruption can lead to cascading failures across interconnected systems, which can amplify the damage presented by the malware. Malware can also be used to steal sensitive information. For example, spyware and keyloggers can be used by bad actors to gain access to certain financial information, which can be used for fraudulent activities and unauthorized financial transactions. The damage that can be inflicted on an enterprise as a result of such an incident can be substantial, particularly if ransomware is involved, if lawsuits result from the incidents, and if consumer trust is damaged. Malware can also degrade performance of the computer systems by causing the systems to slow down or crash. This can lead to system disruptions that can stymie business operations of an enterprise significantly. Further, to resolve the issue, the enterprise may need to implement costly repairs to replace equipment or systems. Thus, a need exists for improved systems and methods for detecting malware.

SUMMARY

Shortcomings of the prior art are overcome, and additional advantages are provided, through the provision of a computing system facilitating malware detection and screening. The system includes at least one processor, a communication interface communicatively coupled to the at least one processor, and one or more memory devices storing executable code. Execution of the executable code causes the at least one processor to, at least in part, receive a malware detection and screening subscription request to screen software application downloads for different types of malware for one or more user devices associated with an entity as part of a firewall subscription. The system also registers the one or more user devices to apply the firewall subscription to screen software application download requests. In addition, the system monitors, via a network firewall, network traffic to the one or more user devices. Further, the system ascertains, via the network firewall and from the monitored network traffic, that a device of the one or more user devices is initiating download of a software application, and the system screens the software application for the different types of malware, where the screening includes a screening protocol. Based on the screening, the system determines that the software application likely includes at least one type of malware from the different types of malware, and the system transmits, to the device of the one or more user devices, a notification that the software application likely includes the at least one type of malware.

Additionally, disclosed herein is a computing system that includes at least one processor, a communication interface communicatively coupled to the at least one processor, and a memory device storing executable code that, when executed, causes the at least one processor to, at least in part, receive a malware detection and screening subscription request to screen software application downloads for different types of malware for one or more user devices associated with an entity as part of a firewall subscription. The one or more user devices are registered such that the firewall subscription is applied to the one or more user devices to screen software application download requests. The system monitors, via a network firewall, network traffic to the one or more user devices and ascertains, via the network firewall and from the monitored network traffic, that a device of the one or more user devices is initiating download of a software application. In addition, the system screens the software application for the different types of malware, the screening including a screening protocol, and the system determines, based on the screening, that the software application likely includes at least one type of malware from the different types of malware. The system also transmits, to the device of the one or more user devices, a notification that the software application likely includes the at least one type of malware, the notification including an interface display that enables a user of the device to override an initial download quarantine process to quarantine the software application.

Also disclosed herein is a computer-implemented method that includes, at least in part, receiving a malware detection and screening subscription request to screen software application downloads for different types of malware for one or more user devices associated with an entity as part of a firewall subscription. The method also includes registering the one or more user devices to apply the firewall subscription to screen software application download requests and monitoring, via a network firewall, network traffic to the one or more user devices. Further, the method includes ascertaining, via the network firewall and from the monitored network traffic, that a device of the one or more user devices is initiating download of a software application, and screening the software application for the different types of malware, the screening including a screening protocol. In addition, the method includes determining, based on the screening, that the software application likely includes at least one type of malware from the different types of malware, and transmitting, to the device of the one or more user devices, a notification that the software application likely includes the at least one type of malware.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
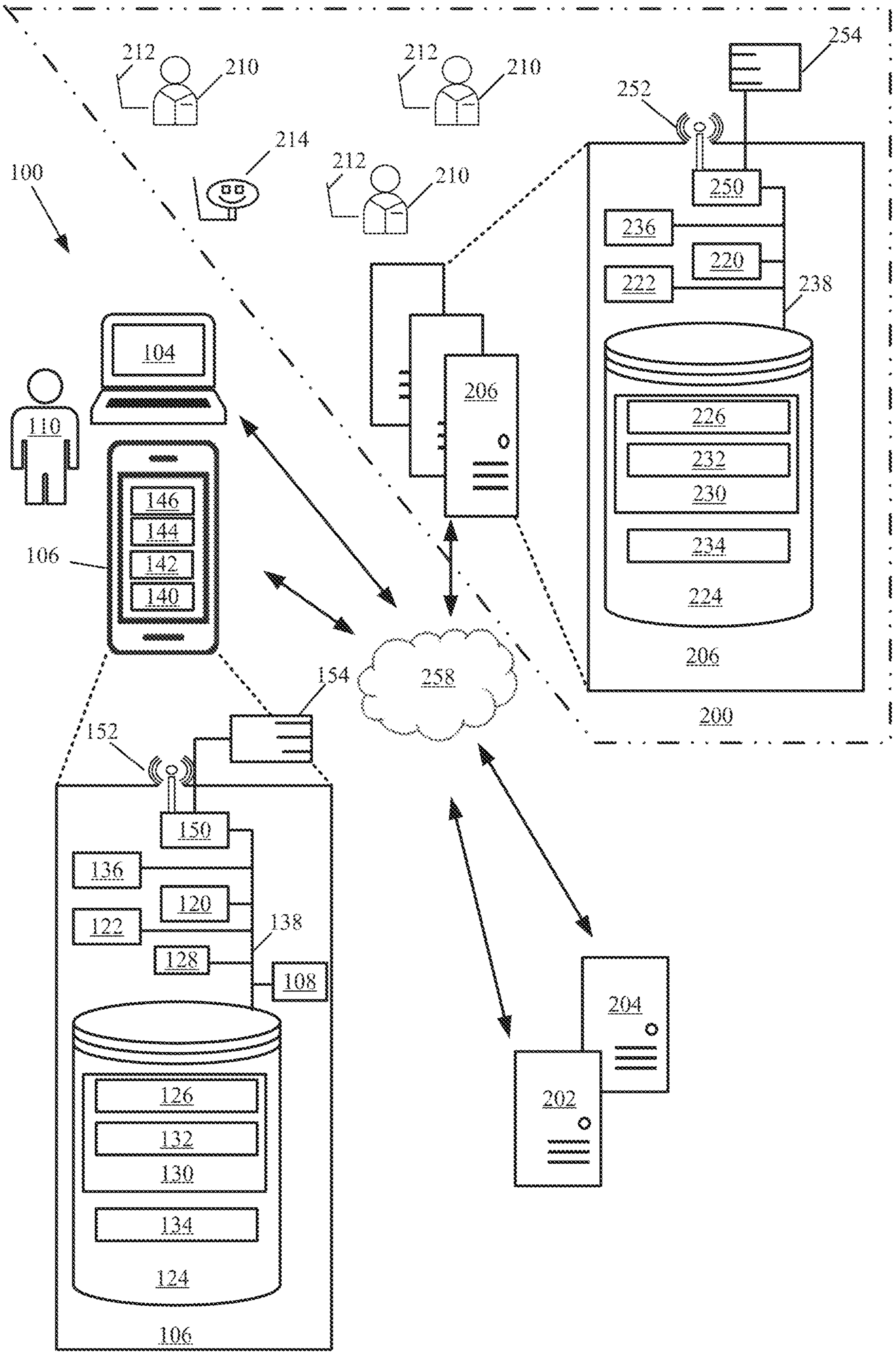
FIG. 1 illustrates an example computing environment of a computing system, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Like numbers refer to like elements throughout. Unless defined otherwise, technical and scientific terms used herein have the same meaning as commonly understood to one of ordinary skill in the art to which the presently disclosed subject matter pertains.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

The specification may include references to "one embodiment," "an embodiment," "various embodiments," "one or more embodiments," etc. may indicate that the embodiment (s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Furthermore, a device or structure that is configured in a certain way is configured in at least that way, but may also be configured in ways that are not listed.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

As used herein, the terms "enterprise" or "provider" generally describes a person or business enterprise (e.g., company, organization, institution, business, university, etc.) that hosts, maintains, or uses computer systems that provide functionality for the disclosed systems and methods. The term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further, the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog-computing environment, and/or an edge-computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a global positioning service (GPS) device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items.

Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, required, or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). Also, the input and output system 136 may include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a GPS configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which global system for mobile communication (GSM) voice calls, SMS, EMS, MMS messaging, time division multiple access (TDMA), code division multiple access (CDMA), PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 TDMA, GSM, and/or IS-95 CDMA, or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, user devices, business entity devices, banking system devices, government entity devices, third-party PaaS, third-party IaaS, and external databases, are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. According to various embodiments, external systems 202 and 204 may utilize software applications that function using external resources that are available through a third-party provider such as SaaS, PaaS, or IaaS service models. Such external systems 202, 204 include the third party systems accessible via the agent devices 212 using a software application (e.g., an integrated mobile software application or an application programming interface (API) software application) that can be integrated with the computing system 206 to facilitate communication between software and systems and also configured to utilize different data formats between systems. In another embodiment, the third party system may be accessible by the agent devices 212 using a web-based software interface (e.g., a website).

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence (AI) and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network, in response to the training data, with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
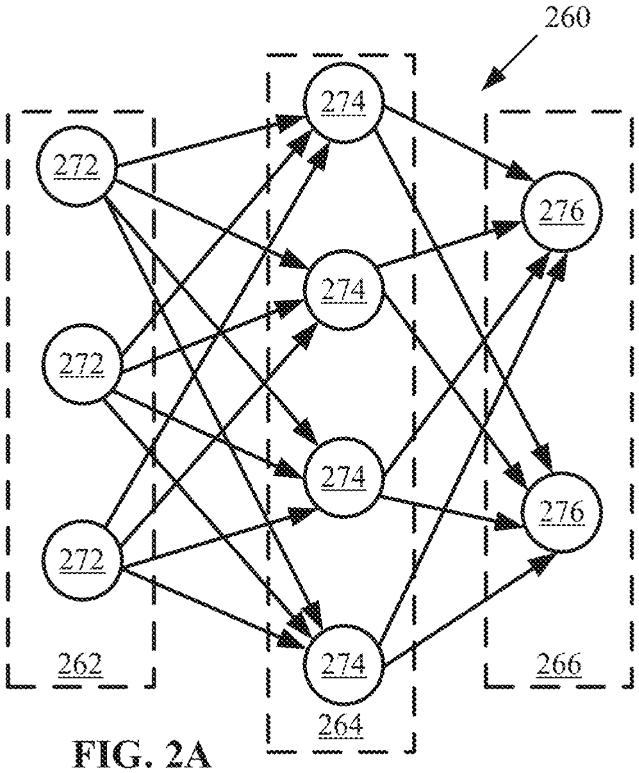
FIG. 2A is a diagram of a feedforward network, according to at least one embodiment, utilized in machine learning.
Figure 2C:
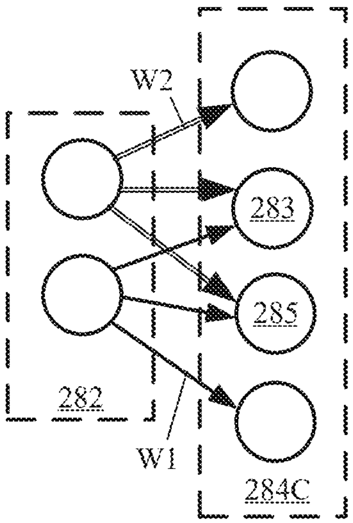
FIG. 2C is a diagram of a portion of the convolution neural network of FIG. 2B, according to at least one embodiment, illustrating assigned weights at connections or neurons.
Figure 2B:
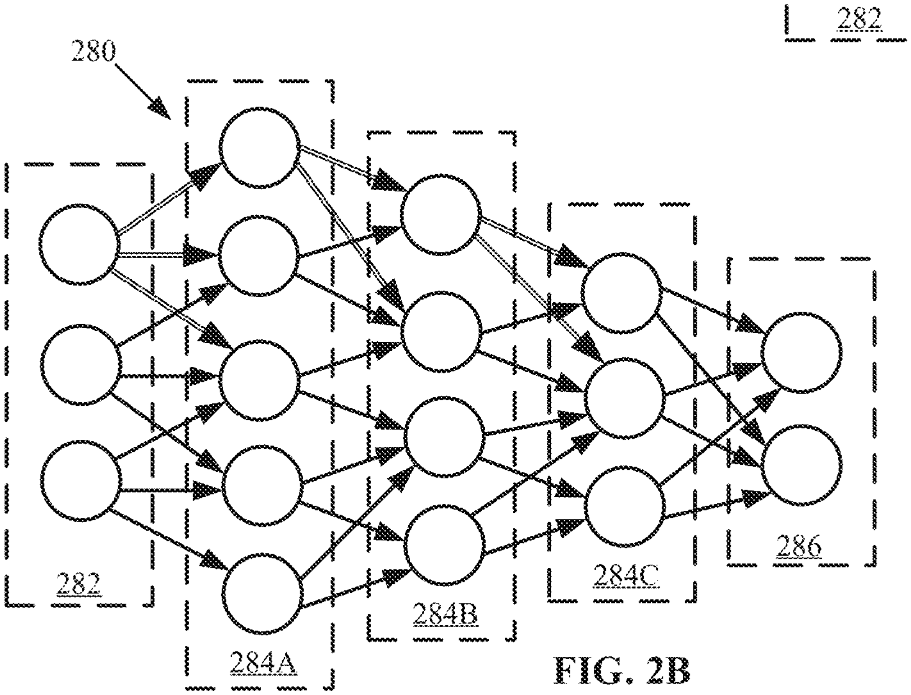
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
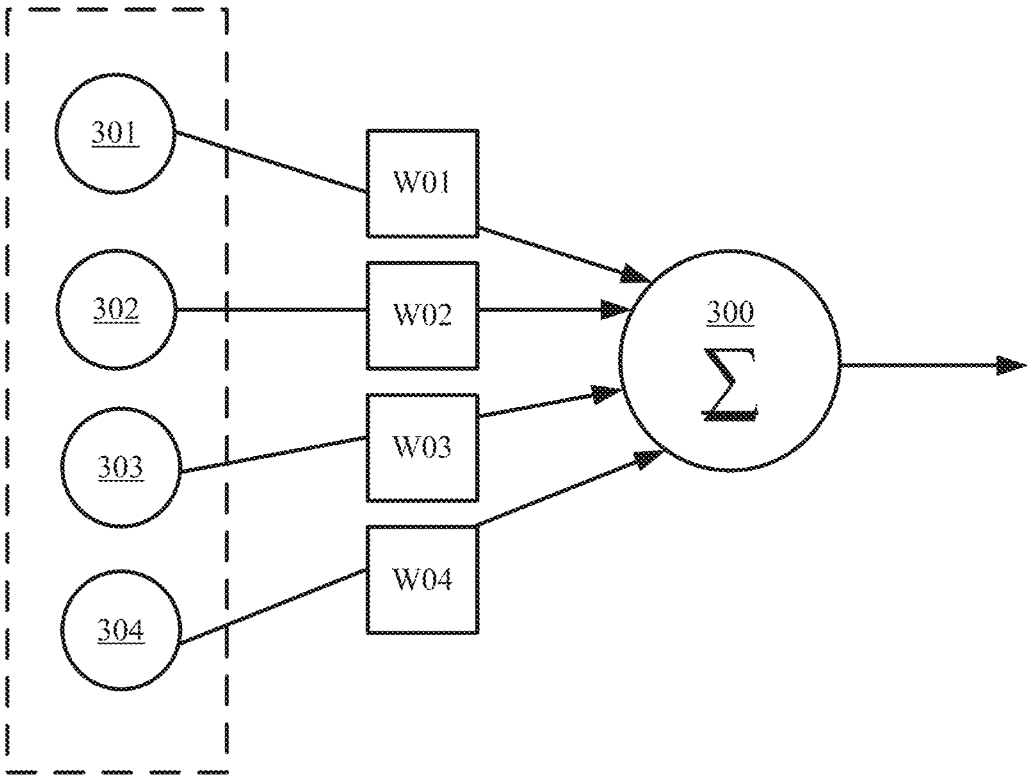
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
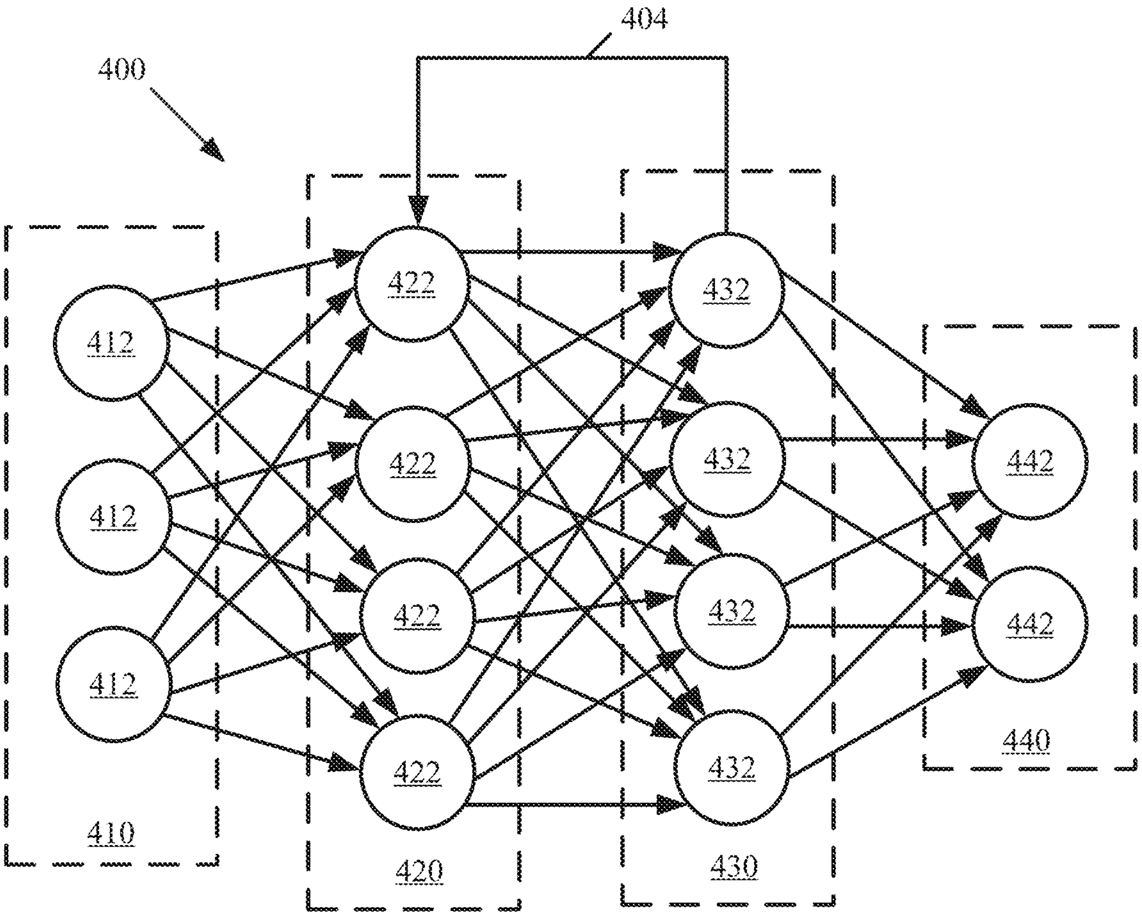
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of non-sequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
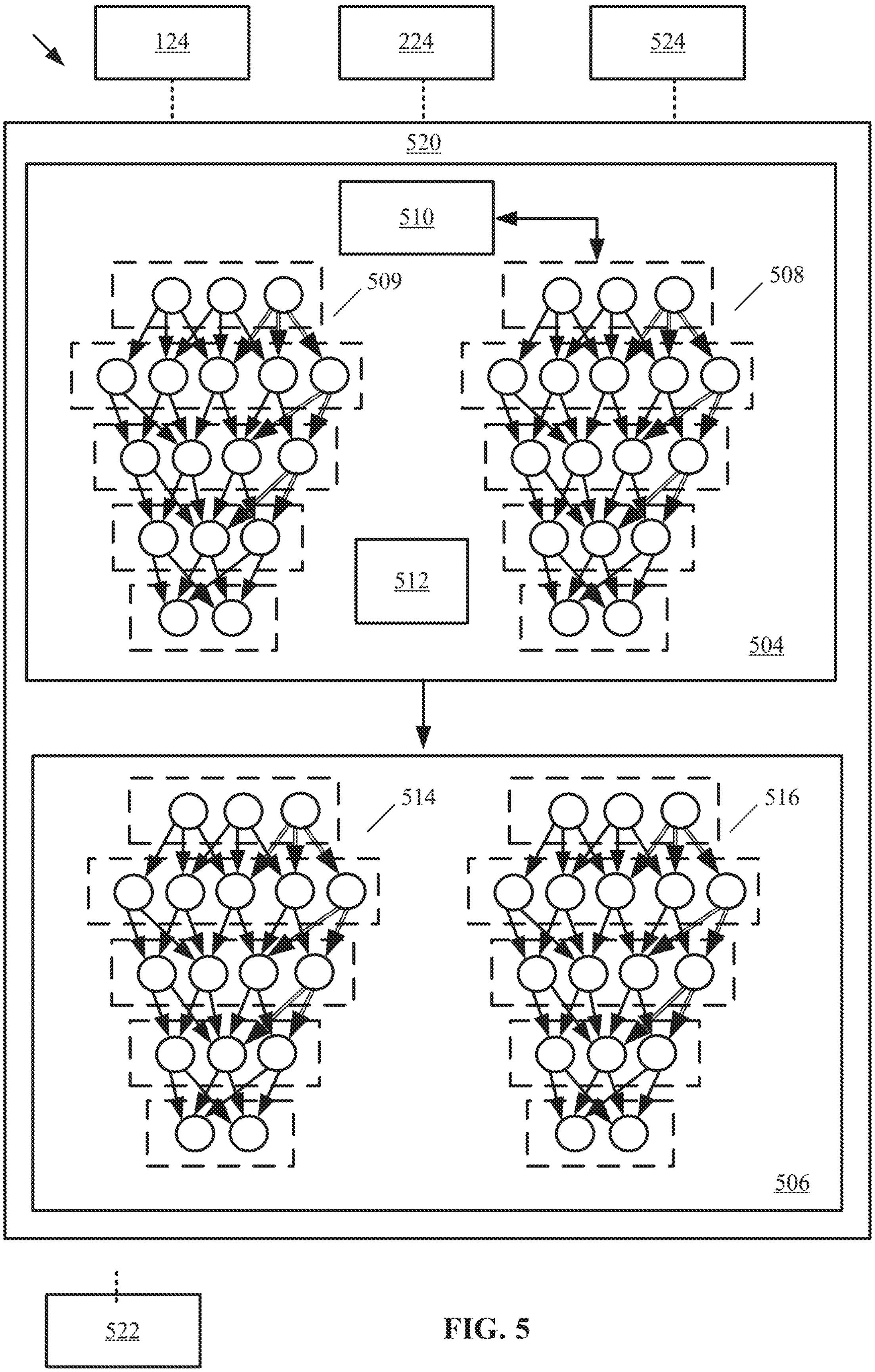
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 522 (e.g., hardware). The machine learning framework may include an index of basic operations, subroutines, and the like (primitives) typically implemented by AI and/or machine learning algorithms. Thus, the AI program 502 may be configured to utilize the primitives of the framework 522 to perform some or all of the calculations required by the AI program 502. Primitives suitable for inclusion in the machine learning framework 522 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
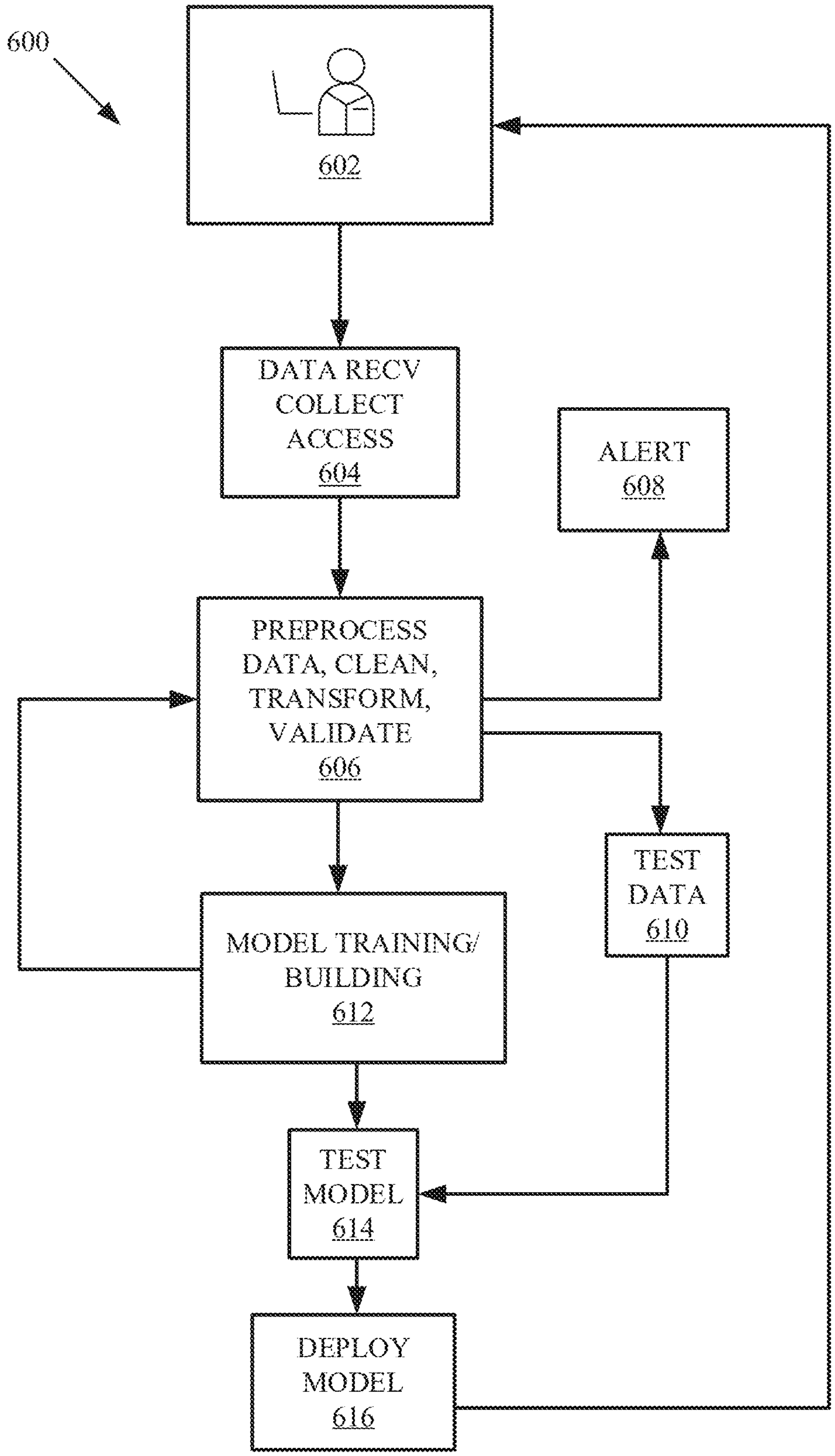
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected (e.g., to confirm that data values are within expected numerical ranges, that data sets are within any expected or required categories, and that data comply with any needed distributions such as within those categories). Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning workflow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

With rapid advancements in technology and diverse employee preferences in operating systems, many enterprises have implemented a "bring-your-own-device" policy. Sometimes the enterprises will provide a spending stipend that employees can use to purchase their own devices (e.g., mobile phones, tablets, laptops, desktops, etc.). This provides greater flexibility to employees while limiting overhead costs for device maintenance and management.

Employee devices may be susceptible to fraudulent attacks via various points of attack (e.g., text message, email, data message, etc.) that may lead employees to click a link or open a message from a fraudulent source that has malicious code. In other instances, employees may download a software application for personal use, but the employee may not be aware that downloading the software application introduces malware onto the device that bad actors can use to exploit the enterprise system. Oftentimes, protected enterprise data can be hacked and used by scammers if the malware is successful. For example, employees of a healthcare organization may utilize their personal device for business purposes in order to view patient information through email or company applications. If the employee downloads a software application on the personal device that incorporates malware, the scammers could potentially gain access to personal health information of the patients. In another example, employees of a financial institution may utilize their mobile phones or home computers for business purposes in order to manage customer accounts or backend systems. If the employee downloads a software application that incorporates malware, the scammers could potentially gain access to customer financial accounts and financial account information in order to withdraw money from the financial accounts.

Thus, a need exists for enterprises to improve the device protection processes of their employees even if the employees are using their own personal and private devices in order to protect important information of the enterprise. However, enterprises are often limited by what they can do to an employee's personal and private device. There are personal privacy concerns about what information employers are able to see about their employees, and enterprises have to be careful about invasion of employee privacy. Due to these concerns, employers may try to balance employee privacy concerns by limiting what the IT administrator can access on the personal devices of the employees. In particular, the IT administrator would not have any visibility into what software applications the employee downloads or uses, what person is using the personal devices, whether the personal devices are being used for malicious purposes, etc.

Some enterprises may attempt to provide a more secure workspace that is operable via the personal device of the employee using, for example, a mobile device management software that allows an IT administrator to configure and adjust settings and policies for all enrolled personal devices via a mobile device management portal. However, there are still limits even when mobile device management software is implemented on the device, as the mobile device management software would not be used to monitor software application downloads. Further, the mobile device management software would not monitor activities performed via software applications that are not related to the enterprise (e.g., social media applications, personal banking applications, gaming applications, etc.). There are still concerns that mobile device management software would have too much access to private and personal information of the employees.

As an alternative, some enterprises use a containerized environment within a personal device that segregates personal and work-related data, applications, and settings. The containerized environment may provide certain protections to the enterprise so that security policies are applied within the containerized environment without the personal privacy concerns. The containerized environment isolates work-related activities to safeguard sensitive information. However, these containerized environments still rely on the same operating services used by applications outside of the container and a malicious software application located outside of the containerized environment can still intercept data that is passed back and forth between the containerized applications and the display screen, keyboard, microphone, speaker, camera, etc. of the personal device. If operations utilizing any one of these hardware elements are compromised, the containerized environment as well as its data and applications can also be compromised.

For example, an employee may utilize their personal or private device to install a software application that outwardly appears to pose no risk to the containerized environment because the application is installed outside the containerized environment with the personal software applications of the employee. However, the application may have spyware that takes repeated screenshots at predetermined time intervals that are then transmitted to a remote server. Later, when the employee accesses the secure container, the malware continues to take repeated screenshots of what is being displayed within the containerized environment, thereby compromising the security of the enterprise. Thus, the screening process needs to be designed not just to protect the container of the enterprise but to also protect the entire device.

Advantageously, the systems and methods disclosed herein provide a new approach to providing security to the personal and private devices of employees while limiting the access that employers would have to the personal and private information of the employees. The systems and methods disclosed herein can be used in conjunction with other security methods implemented by the enterprises. For example, the systems and methods disclosed herein can be used in addition to the containerized environment utilized by the enterprise. The systems and methods disclosed herein provide an improvement in the functioning of a computer or a technical field by improving data and device privacy and security.

In one example, the systems and methods described herein may be used to limit vulnerabilities associated with software application downloads. In this example, the internet provider or a third-party gatekeeping service may offer a subscription for enhanced security via a network firewall.

In some embodiments, a provider of a subscription service for the enhanced network firewall may utilize a message reporting system where users may report whether a software application that was downloaded incorporated malware. In some instances, the provider of the subscription service may monitor network traffic patterns and behavior subsequent to certain software application downloads and may aggregate the data and automatically assign a risk score to the software application. As the risk score that is assigned to the software application surpasses a predefined threshold, the system may automatically apply an enhanced screening process to the software application and potentially block the software application from being downloaded. The blocking process may include transmitting an alert to a software application marketplace maintained by a device developer associated with the operating system of the device in order to prevent the software application from being downloaded from the software application marketplace. Variables identified from network traffic analysis that may contribute to assigning the risk score can include a total volume of network transmissions, the size of data packet transmissions, unusual outbound traffic, sudden spikes and dips in the network traffic to the device, failed connection requests, modified audit trails, abnormal changes in user access processes (e.g., failed user login attempts, abnormal device use at unusual hours, remote account access, etc.).

The systems and methods disclosed herein may provide a screening service that an entity may subscribe to that is provided by an internet provider in order to protect the personal devices of their employees. In one embodiment, the system receives a malware detection and screening subscription request to screen software application downloads for different types of malware for one or more user devices associated with an entity as part of a firewall subscription. The entity that subscribes to the malware detection and screening subscription may provide information about several devices (e.g., IP addresses) that are to be protected. The internet provider may identify whether a registered device is accessing the network and may apply the firewall subscription to that device. In a scenario where the entity is a financial institution that utilizes a bring-your-own-device policy for their employees, the systems and methods described herein would increase the likelihood and the financial institution's work-related systems are protected. In particular, the financial institution may desire to subscribe to the malware detection and screening service in order to better protect the personal and private devices of their employees as a way to add an extra layer of protection for the entity's work-related systems. Thus, the personal devices would be private to the individuals and not provided by the entity. The employees would benefit from having an enhanced security system that would be applied to their device without the concerns that their employer is monitoring their device or internet use. The employer entity would not have any visibility into any network traffic related to the personal and private device of their employee. In this scenario, the entity would not be permitted access to the personal devices without the backing of an enforcement agency that uses a legal enforcement mechanism (e.g., a subpoena, warrant, etc.).

Because the employees may switch their devices or leave their employment, the subscription service may allow the entity to have control over which devices are registered with the subscription service. If the employee is no longer affiliated with the entity, the entity may drop or otherwise remove devices associated with the former employee from the subscription service without needing the former employee to perform any action on the personal and private device. Further, the entity may be able to add or otherwise modify registered devices as new employees or company affiliates are hired or onboarded. Once the entity registers a list of devices, the devices may be registered by adding the device information to a screening database for monitoring network traffic to those recipient devices in order to determine whether registered devices are being used to download software applications that might include malware.

The systems and methods described herein may be used to limit vulnerabilities associated with downloadable software applications that include malware. The system may check the permissions of the downloadable application prior to downloading to determine whether the software application has unnecessary access requests. The system may further automatically review descriptions of the software application to determine whether the software application may have potentially fraudulent content. The system may screen metadata related to the software application to identify abnormal patterns. In some embodiments, the system reviews the privacy policy of the software application to determine whether the source of the software application is potentially fraudulent. In some embodiments, the system may automatically check the reviews associated with the software application to determine whether the software application may be from a potentially fraudulent source, and if there are not sufficient reviews or if the reviews appear to be fraudulent then the system may increase the risk score.

In some embodiments, the systems may perform a grammar analysis to determine whether the amount of mistakes or errors associated with the software application exceed a threshold and will increase the risk score for potentially flagging the application as being potentially fraudulent and/or having malware incorporated therein. In one example, the system may check the total number of downloads of the mobile application as part of the risk assessment and this can impact the risk score.

In some embodiments, the system may automatically cross-check the developer of the software application to determine whether the name of the developer is intended to imitate the name of a legitimate entity. In some embodiments, if the software application was recently released but it initially appears that there are a high number of downloads then this may impact the risk score. In some embodiments, the frequency of updates to the software application may also increase the risk score.

Once a risk score for the software application surpasses a threshold, the screening system determines whether the source of the software application is potentially fraudulent. In such instances, the source may be blocked from providing the software application in an online software application marketplace.

Figure 7:
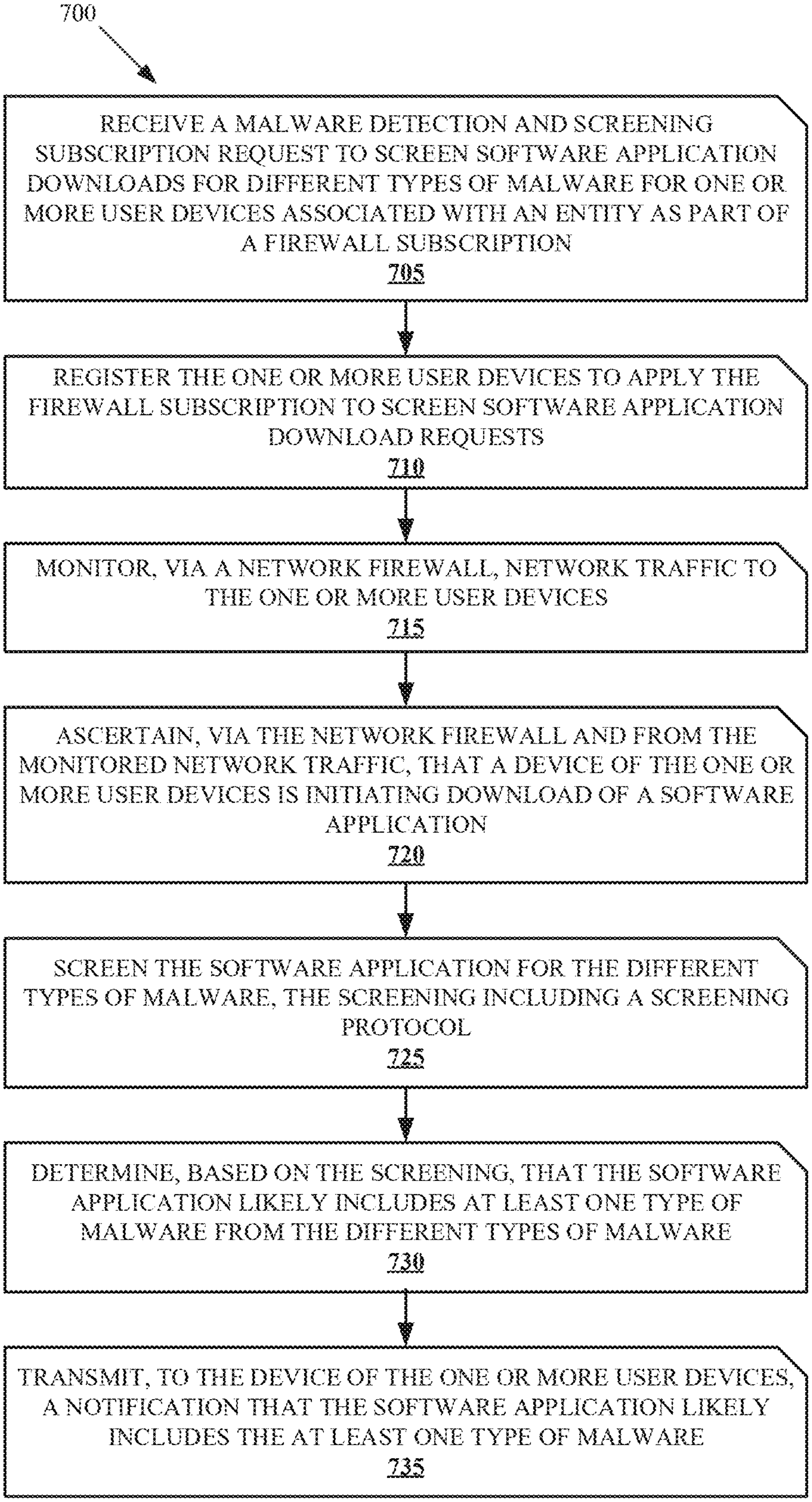
FIG. 7 depicts a block diagram of an example method, in accordance with an embodiment of the present invention.

FIG. 7 depicts a block diagram of an example method 700, in accordance with an embodiment of the present invention. At block 705, the system receives a malware detection and screening subscription request to screen software application downloads for different types of malware for one or more user devices associated with an entity as part of a firewall subscription. At block 710, the system registers or otherwise stores device information about the one or more user devices to which the firewall subscription to screen software application download requests is to be applied. In some embodiments, the firewall subscription is provided by an internet service provider that provides internet connectivity to the one or more user devices, wherein the registering of the one or more devices includes storing an IP address of each of the one or more devices to a storage location. At block 715, the system monitors, via a network firewall, network traffic to the one or more user devices. At block 720, the system ascertains, via the network firewall and from the monitored network traffic, that a device of the one or more user devices is initiating download of a software application.

At block 725, the system screens the software application for the different types of malware, the screening including a screening protocol. In one embodiment, the screening protocol includes comparing known malware signatures stored to a database to one or more files associated with the software application to identify a match. In one embodiment, the screening protocol includes implementing the software application in an isolated environment for a predetermined period of time to derive additional information about the software program prior to permitting download of the software application. In another embodiment, the screening protocol includes a checksum and compares a calculation of the checksum prior to the software application being downloaded to the checksum after the software application has been downloaded. In one embodiment, the screening protocol includes analyzing various structural indicators of the software application to evaluate integrity of the software application.

In another embodiment, the screening protocol includes comparing data of the software application to stored data characteristics that are predicted to be associated with one or more types of the different types of malware. The stored data characteristics may be predicted using a machine learning algorithm. The machine learning algorithm may incorporate the artificial intelligence and neural networks described herein. The machine learning algorithm may be iteratively trained, using training data, to predict presence of the one or more types of the different types of malware. The training may include iteratively simulating, via a training and testing loop, a prediction of a target variable value using the training data. Further, during each iteration of the training and testing loop, the prediction may be tested and compared to the target variable value in order to determine whether the prediction was accurate. Weights that were incorporated into calculations of the machine learning algorithm may be iteratively updated to improve predictability of the target variable during each subsequent iteration of the training and testing loop.

In some embodiments, the machine learning algorithm may incorporate a risk analysis that assigns a risk score accompanied by a confidence level of the risk of associated with the message. If the risk score surpasses a predefined confidence threshold, the system may classify the software application as potentially including malware. In some embodiments, the software application may have a baseline risk score that is increased for each risk indicator that is included in the software application.

The systems and methods disclosed herein are used to detect software applications that may include malware by training the AI model based on input data and a selected training algorithm. In some embodiments, the machine learning algorithm is an artificial intelligence model that is trained to predict whether a source is likely a fraudulent source or a software application is likely to include malware in order to assign the risk score. Once the artificial intelligence model is trained, the model may be used to form predictions about software applications to determine whether it is safe for a user to download the software application. The training can include backpropagation and gradient descent, which uses gradients to help find the weight combination that minimizes the cost function (i.e., the performance of the machine learning algorithm for a data set). The system may detect that a software application is being downloaded by monitoring network traffic being sent across a network, and the system may apply the trained AI model to the data of the software application to determine if it satisfies a threshold criteria for potentially including malware. The system may detect a source associated with the message in real time and block future downloads of the software application from the software application marketplace.

At block 730, the system determines, based on the screening, that the software application likely includes at least one type of malware from the different types of malware. In some embodiments, the different types of malware include at least one selected from the group consisting of ransomware, viruses, spyware, bots, adware, worms, and trojan programs. At block 735, the system transmits, to the device of the one or more user devices, a notification that the software application likely includes the at least one type of malware. In some embodiments, the notification may state the percentage likelihood that the software application incorporates malware. In some embodiments, the notification may indicate the number of reports received from other sources (e.g., feedback received from prior downloads of the software) that the software may include malware. In another example, the notification may provide a source of the software application and/or behavioral information about the source.

In some embodiments, the system further quarantines the software application until an override input is provided in response to the notification. Further, the system may receive the override input and based thereon the system may authorize download of the software application. In addition, the system may transmit an alert to a security risk system of the entity where the alert indicates that the override input was received. The alert may also indicate a risk score that was assigned to the software application so that the entity may ascertain the risk that the download presents to the user device and the entity's overall system security.

In some embodiments, the system sends the alert to the security risk system of the entity in order to obtain a second approval from the entity itself before the software application can be downloaded. For example, the notification may alert the user that if the override input is received that the security risk system of the entity will be alerted. Once the system receives the override input, the system may transmit a message to the user device to notify the user that a request has been made to the entity. The security risk system of the entity may then perform a risk analysis of the software application to determine whether the software application would pose a risk to the entity's systems. If the security risk system determines that the software application is safe to download, then a download initiation message may be transmitted to the user device to authorize downloading the software application.

In some embodiments, the system transmits a notification to the source of the software application that the software application has been flagged as potentially including malware. If the source of the software application wants to their software application to receive approval to be re-listed in the software application marketplace, the source would need to satisfy various security requirements to demonstrate that the software application does not include malware before the software application can be re-listed in the software application marketplace. The security requirements may incorporate a strict security standard.

Figure 8:
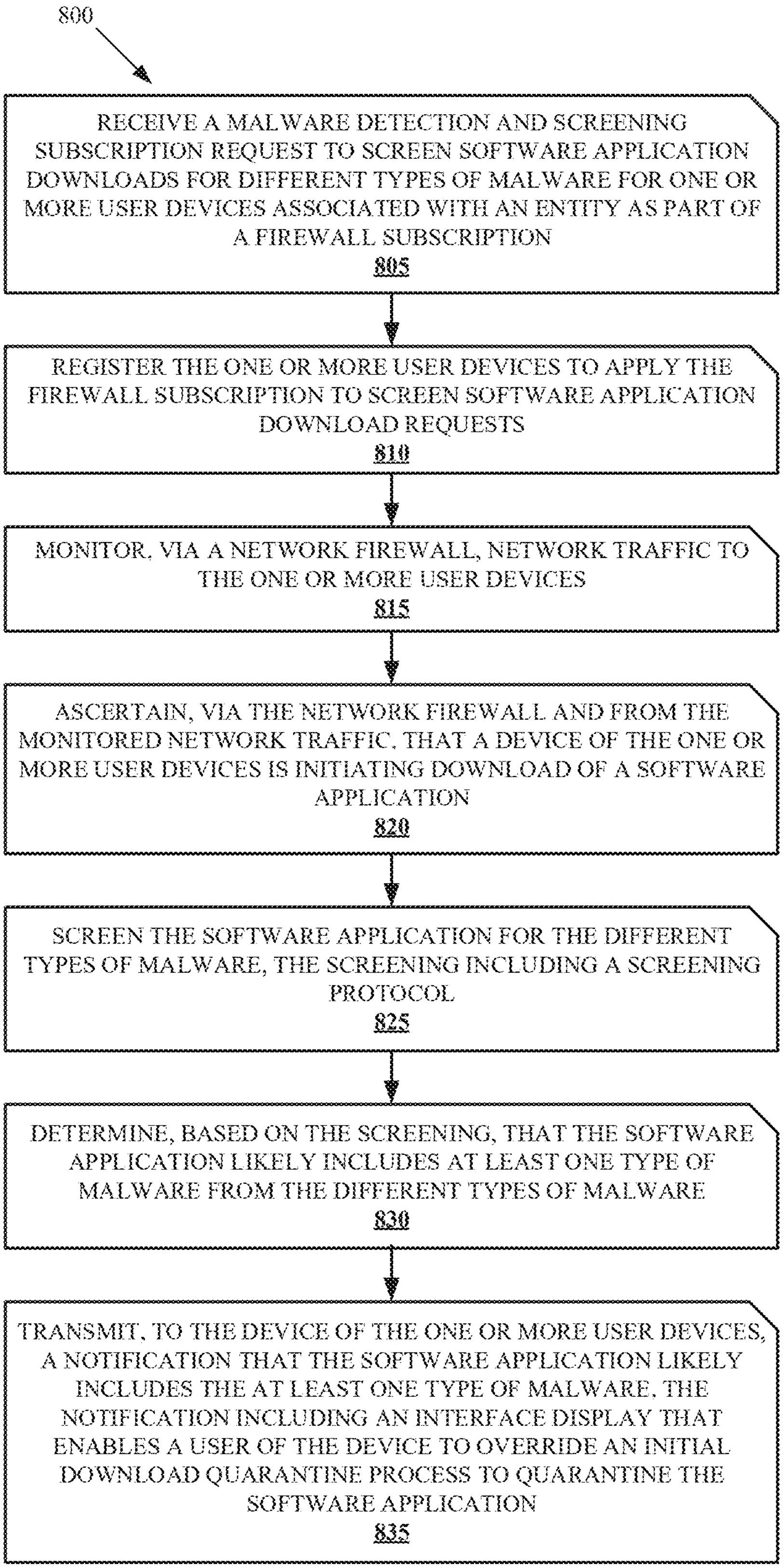
FIG. 8 depicts a block diagram of an example method, in accordance with an embodiment of the present invention.

FIG. 8 depicts a block diagram of an example method 800, in accordance with an embodiment of the present invention. At block 805, the system receives a malware detection and screening subscription request to screen software application downloads for different types of malware for one or more user devices associated with an entity as part of a firewall subscription. At block 810, the system registers the one or more user devices to apply the firewall subscription to screen software application download requests. At block 815, the system monitors, via a network firewall, network traffic to the one or more user devices. At block 820, the system ascertains, via the network firewall and from the monitored network traffic, that a device of the one or more user devices is initiating download of a software application. At block 825, the system screens the software application for the different types of malware, the screening including a screening protocol. At block 830, the system determines, based on the screening, that the software application likely includes at least one type of malware from the different types of malware. At block 835, the system transmits, to the device of the one or more user devices, a notification that the software application likely includes the at least one type of malware, the notification including an interface display that enables a user of the device to override an initial download quarantine process to quarantine the software application. For example, the interface display may be display via a user interface of the user device and may include an indication that the software application is likely to include malware. In order for the software application to be downloaded, the system may require the user to provide an override input to override the initial quarantine process. In some embodiments, the screening protocol includes comparing known malware signatures stored to a database to one or more files associated with the software application to identify a match. In some embodiments, the screening protocol includes comparing data of the software application to stored data characteristics that are predicted to be associated with one or more types of the different types of malware. In some embodiments, the stored data characteristics are predicted using a machine learning algorithm, where the machine learning algorithm is iteratively trained using training data to predict presence of the one or more types of malware. The training may include iteratively simulating, via a training and testing loop, a prediction of a target variable value using the training data. During each iteration of the training and testing loop, the prediction is tested and compared to the target variable value. Further, weights in calculations are iteratively updated in each iteration to improve predictability of the target variable during each subsequent iteration. In some embodiments, the screening protocol includes implementing the software application in an isolated environment for a predetermined period of time to derive additional information about the software program prior to permitting download of the software application. In some embodiments, the screening protocol includes a checksum and compares a calculation of the checksum prior to the software application being downloaded to the checksum after the software application has been downloaded. In some embodiments, the firewall subscription is provided by an internet service provider that provides internet connectivity to the one or more user devices, wherein the registering of the one or more devices includes storing an IP address of each of the one or more devices to a storage location.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A computing system facilitating malware detection and screening, the system comprising:

at least one processor;

a communication interface communicatively coupled to the at least one processor; and a memory device storing executable code that, when executed, causes the at least one processor to:

receive a malware detection and screening subscription request to screen software application downloads for different types of malware for one or more user devices associated with an entity as part of a firewall subscription;

register the one or more user devices to apply the firewall subscription to screen software application download requests;

monitor, via a network firewall, network traffic to the one or more user devices;

ascertain, via the network firewall and from the monitored network traffic, that a device of the one or more user devices is initiating download of a software application;

screen the software application for the different types of malware, the screening including a screening protocol;

determine, based on the screening, that the software application likely includes at least one type of malware from the different types of malware; and transmit, to the device of the one or more user devices, a notification that the software application likely includes the at least one type of malware;

wherein the screening protocol includes comparing data of the software application to stored data characteristics that are predicted to be associated with one or more types of the different types of malware;

wherein the stored data characteristics are predicted using a machine learning algorithm, and wherein the executable code, when executed, further causes the at least one processor to:

iteratively train, using training data, the machine learning algorithm to predict presence of the one or more types of the different types of malware, the training including:

iteratively simulating, via a training and testing loop, a prediction of a target variable value using the training data;

comparing and testing, during each iteration of the training and testing loop, the prediction to the target variable value; and iteratively updating weights in calculations used to improve predictability of the target variable value during each subsequent iteration.

2. The system of claim 1, wherein the screening protocol includes comparing known malware signatures stored to a database to one or more files associated with the software application to identify a match.

3. The system of claim 1, wherein the screening protocol includes implementing the software application in an isolated environment for a predetermined period of time to derive additional information about the software program prior to permitting download of the software application.

4. The system of claim 1, wherein the screening protocol includes a checksum and compares a calculation of the checksum prior to the software application being downloaded to the checksum after the software application has been downloaded.

5. The system of claim 1, wherein the screening protocol includes analyzing various structural indicators of the software application to evaluate integrity of the software application.

6. The system of claim 1, wherein the executable code, when executed, further causes the at least one processor to:

quarantine the software application until an override input is provided in response to the notification;

receive the override input and based thereon authorize download of the software application; and transmit an alert to a security risk system of the entity, the alert indicating the override input was received and indicating a risk score assigned to the software application.

7. The system of claim 1, wherein the different types of malware include at least one selected from the group consisting of ransomware, viruses, spyware, bots, adware, worms, and trojan programs.

8. The system of claim 1, wherein the firewall subscription is provided by an internet service provider that provides internet connectivity to the one or more user devices, wherein the registering of the one or more devices includes storing an IP address of each of the one or more devices to a storage location.

9. The system of claim 6, wherein the executable code, when executed, further causes the at least one processor to determine whether the assigned risk score exceeds a predefined threshold and to include, in the alert, an indication of whether the risk score exceeds the threshold.

10. The system of claim 6, wherein the executable code, when executed, further causes the at least one processor to include, in the alert, information associated with the assigned risk score comprising variables identified from network traffic analysis.

11. A computing system, comprising:

at least one processor;

a communication interface communicatively coupled to the at least one processor; and a memory device storing executable code that, when executed, causes the at least one processor to:

receive a malware detection and screening subscription request to screen software application downloads for different types of malware for one or more user devices associated with an entity as part of a firewall subscription;

register the one or more user devices to apply the firewall subscription to screen software application download requests;

monitor, via a network firewall, network traffic to the one or more user devices;

ascertain, via the network firewall and from the monitored network traffic, that a device of the one or more user devices is initiating download of a software application;

screen the software application for the different types of malware, the screening including a screening protocol;

determine, based on the screening, that the software application likely includes at least one type of malware from the different types of malware; and transmit, to the device of the one or more user devices, a notification that the software application likely includes the at least one type of malware, the notification including an interface display that enables a user of the device to override an initial download quarantine process to quarantine the software application wherein the screening protocol includes comparing data of the software application to stored data characteristics that are predicted to be associated with one or more types of the different types of malware;

wherein the stored data characteristics are predicted using a machine learning algorithm, and wherein the executable code, when executed, further causes the at least one processor to:

iteratively train, using training data, the machine learning algorithm to predict presence of the one or more types of the different types of malware, the training including:

iteratively simulating, via a training and testing loop, a prediction of a target variable value using the training data;

comparing and testing, during each iteration of the training and testing loop, the prediction to the target variable value; and iteratively updating weights in calculations used to improve predictability of the target variable value during each subsequent iteration.

12. The system of claim 11, wherein the screening protocol includes comparing known malware signatures stored to a database to one or more files associated with the software application to identify a match.

13. The system of claim 11, wherein the screening protocol includes implementing the software application in an isolated environment for a predetermined period of time to derive additional information about the software program prior to permitting download of the software application.

14. The system of claim 11, wherein the screening protocol includes a checksum and compares a calculation of the checksum prior to the software application being downloaded to the checksum after the software application has been downloaded.

15. The system of claim 11, wherein the firewall subscription is provided by an internet service provider that provides internet connectivity to the one or more user devices, wherein the registering of the one or more devices includes storing an IP address of each of the one or more devices to a storage location.

16. The system of claim 11, wherein the executable code, when executed, further causes the at least one processor to:

quarantine the software application until an override input is provided in response to the notification;

receive the override input and based thereon authorize download of the software application; and transmit an alert to a security risk system of the entity, the alert indicating the override input was received and indicating a risk score assigned to the software application.

17. The system of claim 11, wherein the different types of malware include at least one selected from the group consisting of ransomware, viruses, spyware, bots, adware, worms, and trojan programs.

18. A computer-implemented method, comprising:

receiving a malware detection and screening subscription request to screen software application downloads for different types of malware for one or more user devices associated with an entity as part of a firewall subscription;

registering the one or more user devices to apply the firewall subscription to screen software application download requests;

monitoring, via a network firewall, network traffic to the one or more user devices;

ascertaining, via the network firewall and from the monitored network traffic, that a device of the one or more user devices is initiating download of a software application;

screening the software application for the different types of malware, the screening including a screening protocol;

determining, based on the screening, that the software application likely includes at least one type of malware from the different types of malware; and transmitting, to the device of the one or more user devices, a notification that the software application likely includes the at least one type of malware;

wherein the screening protocol includes comparing data of the software application to stored data characteristics that are predicted to be associated with one or more types of the different types of malware;

wherein the stored data characteristics are predicted using a machine learning algorithm, and wherein the method further includes:

iteratively training, using training data, the machine learning algorithm to predict presence of the one or more types of the different types of malware, the training including:

iteratively simulating, via a training and testing loop, a prediction of a target variable value using the training data;

comparing and testing, during each iteration of the training and testing loop, the prediction to the target variable value; and iteratively updating weights in calculations used to improve predictability of the target variable value during each subsequent iteration.

19. The computer-implemented method of claim 18, further comprising:

quarantining the software application until an override input is provided in response to the notification;

receiving the override input and based thereon authorize download of the software application; and transmitting an alert to a security risk system of the entity, the alert indicating the override input was received and indicating a risk score assigned to the software application.

20. The computer-implemented method of claim 18, wherein the different types of malware include at least one selected from the group consisting of ransomware, viruses, spyware, bots, adware, worms, and trojan programs.

* * * * *